Nov. 24, 1953  E. C. WILLIAMS  2,660,065
MECHANISM FOR CHANGING ROTARY
MOTION TO OSCILLATING MOTION

Filed Oct. 27, 1948  2 Sheets-Sheet 1

EARL C. WILLIAMS
INVENTOR

BY
*William G. Landwier*
AGENT

Nov. 24, 1953 E. C. WILLIAMS 2,660,065
MECHANISM FOR CHANGING ROTARY
MOTION TO OSCILLATING MOTION
Filed Oct. 27, 1948 2 Sheets-Sheet 2
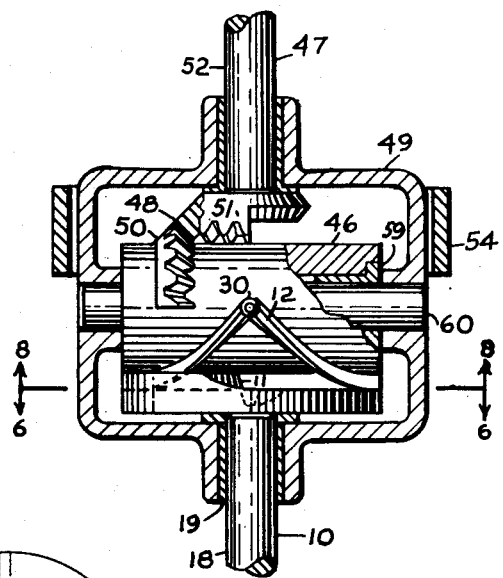
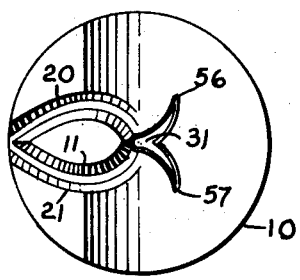
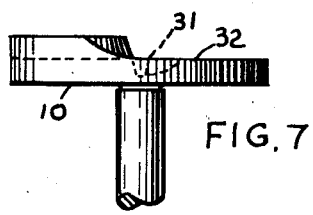
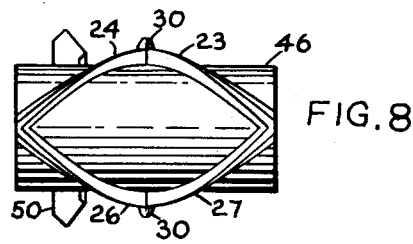
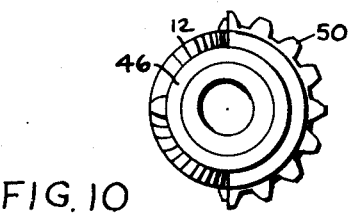
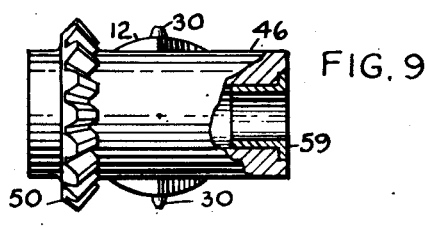
EARL C. WILLIAMS
INVENTOR
BY *William G. Landwier*
AGENT Patented Nov. 24, 1953

2,660,065

UNITED STATES PATENT OFFICE 2,660,065

MECHANISM FOR CHANGING ROTARY MOTION TO OSCILLATING MOTION

Earl C. Williams, Syracuse, N. Y.

Application October 27, 1948, Serial No. 56,884

12 Claims. (Cl. 74—25)

This invention relates to a machine element and more particularly to a mechanism for changing rotary motion to oscillating motion.

In numerous industries such as the textile industry, machine tool industry, etc., it is desired to change rotary motion provided by a suitable prime mover to oscillating motion or alternatively rotary or oscillating motion. In automatic machinery it is often found necessary to provide a movement wherein a driven member is given uniform acceleration in a given direction from a dwell position, uniform deceleration in said given direction to a point of dwell, uniform acceleration in the opposite direction from a position of dwell, and uniform deceleration in said opposite direction to a position of dwell.

It is an object of this invention to provide a mechanism for changing rotary motion to oscillating motion.

It is a further object of this invention to provide a mechanism for changing rotary motion from a prime mover to oscillating motion, said oscillating motion being characterized by uniform acceleration and deceleration in a given direction between positions of dwell.

It is a further object of this invention to provide a mechanism for changing rotary motion to oscillating motion that may be cheaply manufactured and with a minimum of parts.

It is a further object to provide a mechanism for alternatively changing rotary motion to oscillating motion or transmitting said rotary motion unchanged.

Other objects of the invention will appear hereinafter, the novel features and combinations being set forth in the appended claims.

Generally described, the present invention comprises a housing member retaining in operable position a driving member having a logistic engaging member thereon and a driven member having a helical engaging member thereon adapted to operably engage said logistic engaging member.

A preferred embodiment of the invention has been chosen for purposes of illustration and description and is shown in the accompanying drawings forming a part of the specification wherein like figures refer to like parts wherever they occur:

Figure 5 is a cross sectional, elevational view of an alternative embodiment of the invention;

Figure 6 is a plan view of the driving member of the invention taken substantially along line 6—6 of Fig. 5;

Figure 7 is a front elevational view of Fig. 6;

Figure 8 is a bottom elevational view of the driven member of the alternative embodiment of the invention taken along line 8—8 of Fig. 5;

Figures 9 and 10 are top and side elevational views respectively of the driven member shown in Figure 7.

Figure 1:
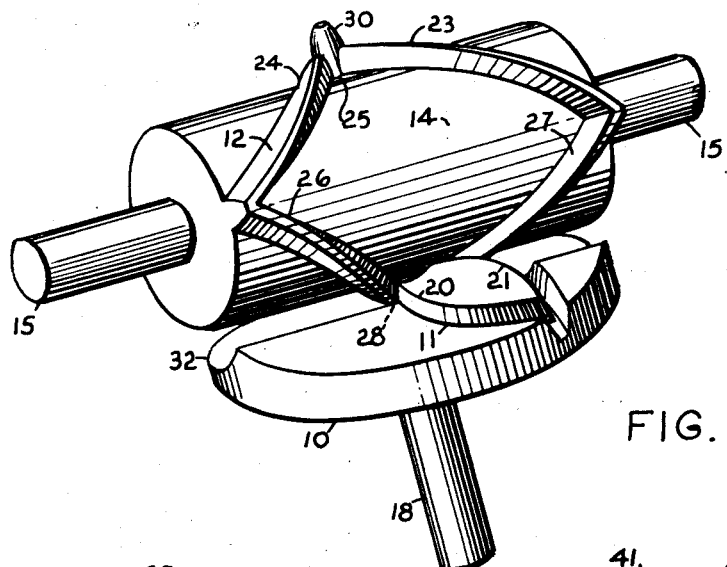
Figure 1 is an isometric, elevational view of the basic elements of the invention in operating position.

With reference to Figure 1, the basic elements of the invention are shown in operating position. A driving member 10 having logistic engaging means 11, is adapted to operably engage a helical engaging means 12 of a driven member 14.

Figure 2:
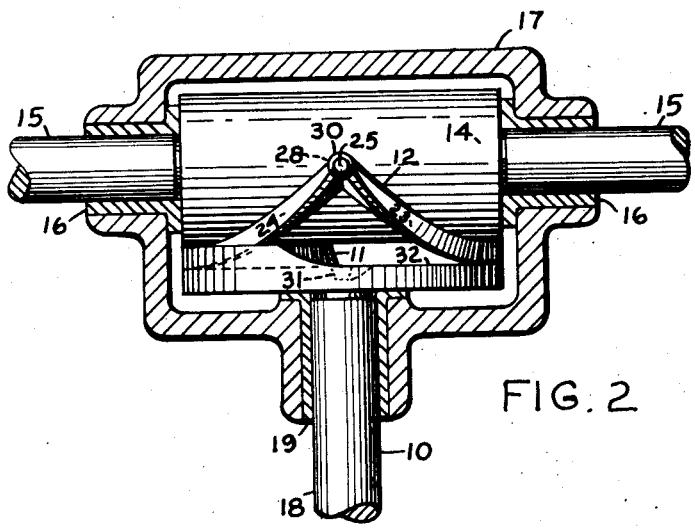
Figure 2 is a cross sectional, elevational view of the elements of the invention enclosed in a suitable housing.

Extension shafts 15 are rigidly attached to the cylindrical driven member 14 and are adapted to be supported as shown in Figure 2 by bearing members 16 in a housing 17. A drive shaft 18 is rigidly attached to the driving member 10 and is adapted to be supported as shown in Figure 2 by a suitable bearing member 19 in the housing 17 and driven by a source of rotary motive power (not shown). The driving member 10 is substantially a rotatable plate having defined thereon engaging means 11 formed with a contour having both right hand and left hand logarithmic curves, 20 and 21 respectively, originating at the center of the unit, namely the central axis of the driving member 10, and proceeding outwardly at a predetermined angle commensurate with the helix angle of the helical engaging means 12. The angles in point will be discussed hereinafter with relation to Figs. 3 and 4. The helical engaging means 12 is formed about the cylindrical member 14 and includes two pairs of right hand and left hand helical engaging members, namely a pair 23 and 24, right and left hand respectively, intersecting at a central point of juncture 25 and a similar pair 26 and 27, right and left hand respectively, intersecting at a central point of juncture 28.

In the preferred embodiment shown in Figures 1 and 2 the cross sectional contour of the tooth form of the helical engaging means 12 is preferably involute in form with a predetermined pressure angle and that of the logarithmic engaging means 11 a recess preferably corresponding to that of a rack tooth of a commensurate pressure angle to produce an odontical action with said helical engaging member.

A transition member or engaging tooth 30 is placed at each point of juncture (25 and 28) of the opposite hand portions of the helical engaging means 12, said transition member 30 being operable in a plane of oscillation passing through the central axis of the driving member 10. A function of said transition member 30 is to insure a positive engagement between the driven and driving members of the invention when engagement is being transferred from one portion of the logistic engaging means 11 to that of the opposite hand portion at the central axis of the unit. A recess 31 is generated in the driving member 10 and about the central axis thereof to engage the transition member 30. A clearance portion 32 is cutaway in the driven member 10 to provide clearance for the oscillating driven member 44.

The operation of the invention is based on the premise that a helix of a predetermined angle described on a rotatable cylinder will have a conjugate coordinate action with a logarithmic spiral of the same angle described on and originating at the center of a rotatable plate. The axis of rotation of said rotatable plate should be substantially perpendicular to the central axis of the rotatable cylinder and in the same plane thereof.

Figure 3:
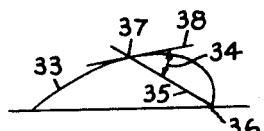
Figure 3 is a diagrammatic plan view of a right hand logarithmic spiral illustrating the angular characteristics under consideration.
Figure 4:
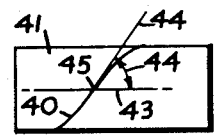
Figure 4 is a diagrammatic plan view of a left hand helix on a cylinder, illustrating the angular characteristics under consideration.

Figures 3 and 4 are diagrammatic illustrations of the basic considerations involved in the invention.

In Figure 3 is illustrated a diagram of a typical right hand logarithmic curve 33 showing a logarithmic angle 34 as determined by the intersection of a radial line 35 from the origin of the spiral 36 to any point 37 on the curve with a tangent 38 drawn to said curve 33 at said point 37.

In Figure 4 is illustrated a diagram of a typical left hand helix 40 drawn about a cylinder 41 showing a helix angle 42 as determined by the intersection of a line 43 on the surface of said cylinder 41 and parallel with the central axis of said cylinder with the helix 40 and a line 44 tangent to said helix 40 at said point of intersection 45.

In considering the helix angle of the helical engaging means 12 of the invention above diagrammatically illustrated in Figure 3, angular measurement is taken on the outside diameter of said helical engaging means.

In order to obtain the desired objectives in accordance with this invention the construction comprises as stated above a right and left hand angle logarithmic spiral, 20 and 21 respectively, originating at the center of rotation of a driving member 10 and engaging conjugately and coordinately the helical engaging means 12 of the cylindrical driven member 14.

Oscillation of said driven member 14 is produced by rotation of said driving member 10, and the point of dwell and reversal of direction of movement of the oscillating member occurs when the points of juncture 25 and 28 of the helical engaging means 12 become aligned with the central axis of the driving member. Between positions of dwell the oscillation of the driven member is characterized by uniform acceleration and uniform deceleration.

The relative velocities of the oscillating cylindrical driven member 14 and the rotating driving member 10 is dependent on the instantaneous radii in contact at a given point.

With reference to Figure 5, an alternative embodiment is shown wherein a primary driven member 46, similar to driven member 14 shown in Figure 2, is adapted to drive a secondary driven member 47 through a suitable right angular engaging means 48. A housing 49 is adapted to retain the driving member 10, driven member 46 and the secondary driven member 47 in operable relationship. The right angular engaging means 48 includes a segmental driving bevel gear 50 rigidly affixed to said cylindrical primary driven member 46 and a segmental driven bevel gear 51 rigidly affixed to an output shaft 52 of the secondary driven member 47. In this embodiment, rotary motion supplied to the driving member 10 is transformed to oscillating motion in the secondary driven member 47, said oscillating motion being transferred from said primary driven member 46 by said right angular engaging means 48 to the secondary driven member 47. With the housing 49 held in a stationary position by suitable holding means 54, such as a band brake, clutch, or the like, rotary motion supplied to the driving member 10 is transformed in the unit and appears as oscillating motion from the secondary driven member 47. Release of said holding means 54 to allow free rotation of said housing 49 will result in the rotary motion supplied to the driven member 10 being transmitted through the unit to impart said rotary motion to the secondary driven member 47. This behavior is due to the fact that the driven member 46 will rotate to a position wherein the transition member 30 will seek engagement at the central axis of the unit and further oscillation is prevented as long as the housing 49 remains free to turn with the secondary driven member 47.

As shown in Figure 6, a recess 31 is developed in the driving member 10 about the central axis and at the juncture of the right and left hand logarithmic engaging means 11. Full depth and contour of the transition member 30 is formed at the central axis of the driving member 10 and clearance grooves 56 and 57 are formed of a contour to provide clearance paths for the engagement of the transition member 30 at the central axis. The driving member 10 is substantially a disc with a clearance portion 32 cutaway to provide clearance for the oscillating primary driven member 46. The right angular engaging means 48 is preferably formed with involute tooth sections commensurate with well known gear practices and the radial length of the segments necessary is commensurate with the angle of oscillation of the primary driven member 46 for which the unit is designed. In the alternative embodiment shown in Figure 5, driven member 46 is preferably mounted on bearing members 59 and adapted to be rotatable about a central shaft 60 which is rigidly affixed to the housing 49.

The present invention is of particular value in automatic machinery wherein oscillating movement must be obtained at relatively high speeds. The gradual acceleration and gradual deceleration of the movement derived from this invention between points of dwell is one of the chief factors which make operation at relatively high speeds possible since the inertia of the driven members need not be seriously limited. The objectives of the invention are attained as herein described by a minimum number of parts coordinating in such a manner as to make wear a negligible factor and manufacturing a simple procedure.

Having now described and illustrated one form of my invention, I wish it to be understood that my invention is not to be limited to the specific form or arrangement of parts herein described and shown, or specifically covered by my claims.

What I claim and desire to protect by Letters Patents is:

1. In a mechanism for producing oscillating motion, the combination with a housing member of a driving member having logistic engaging means, said logistic engaging means including right and left hand logarithmic engagement members; and a driven member having a central axis substantially perpendicular to the axis of rotation of said driving member and having helical engaging means adapted to operably engage said logistic engaging means.

2. In a mechanism for producing oscillating motion, the combination with a housing member of a driving member having logistic engaging means, said logistic engaging means including right and left hand logarithmic engagement members; and a driven cylindrical member having a central axis substantially perpendicular to the axis of rotation of said driving member and having helical engaging means adapted to operably engage said logistic engaging means.

3. In a mechanism for producing oscillating motion, the combination of a housing member; a driving member having logistic engaging means, said logistic engaging means including right and left hand logarithmic engagement members; and a driven member having helical engaging means adapted to operably engage said logistic engaging means, said helical engaging means including two pairs of right and left hand helical engaging members.

4. In a mechanism for producing oscillating motion, the combination with a housing member of a driving member having logistic engaging means, said logistic engaging means including right and left hand logarithmic engagement members originating at the central axis of said driving member; an a driven member having a central axis substantially perpendicular to the axis of rotation of said driving member and having helical engaging means adapted to operably engage said logistic engaging means.

5. In a mechanism for producing oscillating motion, the combination with a housing member of a driving member having logistic engaging means, said logistic engaging means including right and left hand logarithmic engagement members originating at the central axis of said driving member and proceeding outwardly at a predetermined angle; and a driven member having a central axis substantially perpendicular to the axis of rotation of said driving member and having helical engaging means adapted to operably engage said logistic engaging means.

6. In a mechanism for producing oscillating motion, the combination of a housing member; a driving member having logistic engaging means, said logistic engaging means including right and left hand logarithmic members; and a driven member having helical engaging means adapted to operably engage said logistic engaging means, said helical engaging means including two pairs of right and left hand helical engaging members, each of said pairs intersecting at a central point of juncture.

7. In a mechanism for producing oscillating motion, the combination of a housing member; a driving member having logistic engaging means, said logistic engaging means including right and left hand logarithmic engagement members; and a driven member having helical engaging means adapted to operably engage said logistic engaging means, said helical engaging means including two pairs of right and left hand helical engaging members, each of said pairs intersecting at a central point of juncture, and a transition member disposed at said point of juncture.

8. In a mechanism for producing oscillating motion, the combination of a housing member; a driving member having logistic engaging means, said logistic engaging means including right and left hand logarithmic engagement members originating at the central axis of said driving member and proceeding outwardly at a predetermined angle, said logarithmic engaging members beings of recessed cross-sectional contour corresponding to a rack tooth form in said driving member; and a cylindrical driven member having helical engaging means adapted to operably engage said logistic engaging means, said helical engaging means including two pairs of right and left hand helical engaging members, each of said pairs intersecting at a central point of juncture, and a transition member disposed at said point of juncture.

9. In a mechanism for producing oscillating motion, the combination with a housing member of a driving member having logistic engaging means; a driven member having a central axis substantially perpendicular to the axis of rotation of said driving member and having helical engaging means adapted to operably engage said logistic engaging means; a secondary driven member; and releasable holding means adapted to prevent rotation of said housing member.

10. In a mechanism for producing oscillating motion, the combination of a housing member; a driving member having logistic engaging means; a driven member having helical engaging means adapted to operably engage said logistic engaging means; a secondary driven member; right angular engaging means between said secondary driven member and said driven member; and holding means adapted to prevent rotation of said housing member.

11. In a mechanism for producing oscillating motion, the combination of a housing member; a driving member having logistic engaging means; a driven cylindrical member having helical engaging means adapted to operably engage said logistic engaging means; a secondary driven member; engaging means between said secondary driven member and said driven member; and releasable holding means adapted to prevent rotation of said housing member.

12. In a mechanism for producing oscillating motion, the combination of a housing member; a driving member having logistic engaging means, said logistic engaging means including right and left hand logarithmic engagement members originating at the central axis of said driving member and proceeding outwardly at a predetermined angle; a cylindrical driven member having helical engaging means adapted to operably engage said logistic engaging means, said helical engaging means including two pairs of right and left hand helical engaging members, each of said pairs intersecting at central points of juncture, and a transition member disposed at each point of juncture; a secondary driven member; right angular engaging means between said secondary driven member and said driven member including a segmental driving bevel gear rigidly affixed to said driven member and a driven bevel gear rigidly affixed to said secondary driven member; and releasable holding means, adapted to prevent rotation of said housing member.

EARL C. WILLIAMS.

References Cited in the file of this patent

UNITED STATES PATENTS

| Number | Name | Date |
|---|---|---|
| 751,317 | Lindsay | Feb. 2, 1904 |
| 824,969 | Anderson | July 3, 1906 |
| 1,180,639 | Geyer | Apr. 25, 1916 |
| 1,425,496 | Huntley | Aug. 8, 1922 |
| 2,454,293 | Waseige | Nov. 23, 1948 |

FOREIGN PATENTS

| Number | Country | Date |
|---|---|---|
| 127,261 | Austria | Nov. 15, 1931 |